(12) United States Patent
Mullen (10) Patent No.: US 10,275,664 B2
(45) Date of Patent: *Apr. 30, 2019

(54) PERCEPTION-BASED SPEED LIMIT ESTIMATION AND LEARNING

(71) Applicant: Ford Global Technologies, LLC., Dearborn, MI (US)

(72) Inventor: Jonathan Thomas Mullen, Palo Alto, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/643,332

(22) Filed: Jul. 6, 2017

(65) Prior Publication Data

US 2017/0308759 A1    Oct. 26, 2017

Related U.S. Application Data (63) Continuation of application No. 14/919,540, filed on Oct. 21, 2015, now Pat. No. 9,747,506.

(51) Int. Cl.
*G06K 9/00* (2006.01)
*B60R 1/00* (2006.01)
(Continued)

(52) U.S. Cl.
CPC ............ *G06K 9/00791* (2013.01); *B60R 1/00* (2013.01); *G06K 9/66* (2013.01); *G08G 1/0112* (2013.01);
(Continued)

(58) Field of Classification Search
CPC ....... G06K 9/00771; G06K 9/00791–9/00825; G06K 9/6288; G06K 9/6293; G06K 9/66;
(Continued)

(56) References Cited

U.S. PATENT DOCUMENTS

| 6,934,613 B2 | 8/2005 | Yun |
| 7,930,096 B2 * | 4/2011 | Kubota ................. B60Q 9/008 340/575 |

(Continued)

FOREIGN PATENT DOCUMENTS

| CN | 102848920 A | 1/2013 |
| CN | 104527427 A | 4/2015 |
| JP | 2012185076 A | 9/2012 |

OTHER PUBLICATIONS

Daniel Cooper, Ford's new car will force you to obey the speed limit, Engadget.com, Mar. 24, 2015.

*Primary Examiner* — Jose L Couso
(74) *Attorney, Agent, or Firm* — David R. Stevens; Stevens Law Group (57) ABSTRACT

Systems, methods, and devices for estimating a speed limit are disclosed herein. A system for estimating a speed limit includes one or more perception sensors, an arbitrated speed component, an attribute component, an estimator component, and a notification component. The one or more perception sensors are configured to generate perception data about a region near a vehicle. The arbitrated speed component is configured to determine that a high confidence or arbitrated speed limit is not available. The attribute component is configured to detect one or more environmental attributes based on the perception data. The estimator component is configured to determine an estimated speed limit based on the environmental attributes. The notification component is configured to provide the estimated speed limit to an automated driving system or driver assistance system of the vehicle.

20 Claims, 8 Drawing Sheets

(51) Int. Cl.
*G06K 9/66* (2006.01)
*G08G 1/0962* (2006.01)
*G08G 1/0967* (2006.01)
*G08G 1/01* (2006.01)
*G08G 1/052* (2006.01)

(52) U.S. Cl.
CPC .......... *G08G 1/0129* (2013.01); *G08G 1/052* (2013.01); *G08G 1/09623* (2013.01); *G08G 1/09626* (2013.01); *G08G 1/09675* (2013.01); *G08G 1/096716* (2013.01); *G08G 1/096725* (2013.01); *G08G 1/096775* (2013.01); *G08G 1/096783* (2013.01); *G08G 1/096791* (2013.01); *B60R 2300/307* (2013.01)

(58) Field of Classification Search
CPC ............ G06K 2209/21; G06K 9/00818; G06T 7/004; G06T 7/20; G06T 2207/10016; G06T 2207/30236; G06T 2207/30248–2207/30264; B60R 1/00; B60R 16/0231; B60R 21/01; B60R 25/32; B60R 2021/01013; B60R 2300/30–2300/302; B60R 2300/80; B60R 2300/307; B60R 2300/8086–2300/8093; G01P 1/10; G01P 3/50; G05D 1/0223; G05D 1/0276–1/0285; G05D 13/00; G08G 1/00; G08G 1/052; G08G 1/09623–1/09626; G08G 1/0967–1/09671; G08G 1/0112; G08G 1/0129; G08G 1/165; G08G 1/166; G08G 1/167; B60K 31/00–31/02; B60K 31/18–31/185; B60K 31/0058; B60W 30/143; B60W 30/0956; B60W 2550/10; B60W 2550/22; B60W 2550/402; B60W 2720/10; B60W 2720/103; B60W 2720/12; B60W 2420/42; B60W 2520/10; B60W 2520/125; B60W 2550/12; B60W 2720/106; B60W 30/14; B60W 30/146; B60W 30/16; B60W 30/18154; G01C 21/3697; G01C 21/26; G01C 21/3492; G01C 21/3602; B60Q 9/008; B62D 15/0255; B62D 15/029; B62D 6/007
See application file for complete search history.

(56) References Cited

U.S. PATENT DOCUMENTS

| | | | | |
|---|---|---|---|---|
| 8,138,947 | B2* | 3/2012 | Ichihashi | G08G 1/096716 340/901 |
| 8,700,299 | B2* | 4/2014 | Morita | G08G 1/096716 701/123 |
| 8,725,394 | B2* | 5/2014 | Bahlmann | B60W 30/146 340/907 |
| 9,070,293 | B2 | 6/2015 | Roeber et al. | |
| 9,221,463 | B2* | 12/2015 | Choi | B60W 30/146 |
| 9,336,448 | B2* | 5/2016 | Fowe | G06T 7/20 |
| 9,539,901 | B1* | 1/2017 | Clauss | B60K 31/18 |
| 9,847,021 | B2* | 12/2017 | McClellan | G01S 5/0027 |
| 9,880,186 | B2* | 1/2018 | Kumar | G01P 1/103 |
| 9,892,641 | B2* | 2/2018 | Yokochi | G08G 1/09675 |
| 2005/0267658 | A1* | 12/2005 | Yuan | B60W 30/146 701/36 |
| 2008/0004789 | A1* | 1/2008 | Horvitz | G01C 21/3492 701/117 |
| 2009/0259395 | A1* | 10/2009 | Sobue | G01C 21/36 701/532 |
| 2013/0110371 | A1* | 5/2013 | Ogawa | G08G 1/09623 701/70 |
| 2013/0245877 | A1 | 9/2013 | Ferguson et al. | |
| 2014/0081507 | A1 | 3/2014 | Urmson et al. | |
| 2015/0035981 | A1* | 2/2015 | Otsuki | G08G 1/09623 348/148 |
| 2016/0214608 | A1* | 7/2016 | Packwood-Ace | B60W 30/14 |
| 2017/0154554 | A1* | 6/2017 | Tanaka | G06K 9/00798 |
| 2018/0015920 | A1* | 1/2018 | Schuberth | B60W 30/143 |
| 2018/0023973 | A1* | 1/2018 | Ivanov | G01C 21/3697 |
| 2018/0079410 | A1* | 3/2018 | Yamashita | B60W 30/146 |
| 2018/0079411 | A1* | 3/2018 | Inoguchi | B60W 30/146 |

* cited by examiner

PERCEPTION-BASED SPEED LIMIT ESTIMATION AND LEARNING

CROSS-REFERENCE TO RELATED APPLICATIONS

This application is a continuation of and claims the benefit of and priority to U.S. Pat. No. 9,747,506, entitled "Perception-Based Speed Limit Estimation And Learning", filed Oct. 21, 2015 by Jonathan Thomas Mullen, the entire contents of which are expressly incorporated by reference.

TECHNICAL FIELD

The disclosure relates generally to methods, systems, and apparatuses for automated driving or for assisting a driver, and more particularly relates to methods, systems, and apparatuses for determining or estimating a speed limit.

BACKGROUND

Automobiles provide a significant portion of transportation for commercial, government, and private entities. Due to the high cost and value of automobiles and potential harm to passengers and drivers, driver safety and avoidance of collisions or accidents are extremely important. In order to increase safety and reduce risk of property damage many roads have speed limits for vehicles, which may be enforced by law enforcement organizations.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Although speed limits are often present on roads, these legal speed limits (or, simply, speed limits) are not always immediately apparent to drivers. As an example, consider that upon entering an interstate highway, it can be several miles before one sees a speed limit sign. As another example, there may be no posted speed limit within a residential area, but a "town" speed limit may still be in effect. In these cases, human drivers may be expected to use judgment in estimating the speed limit. In some cases, a vehicle may be controlled by an automated driving system (or other "virtual driver") that controls the vehicle using sensors, which detect the environment. In some instances, speed limit information may be available to the automated driving system or virtual driver via a map, electronic horizon, or speed limit sign. In others, the automated driving system or virtual driver may be without speed limit information, and may need to estimate a reasonable speed limit. However, if a vehicle driving system or human driver incorrectly estimates a speed limit, there may be an increased risk of an accident or speed limit violation for the vehicle.

The present application discloses systems, methods, and devices for estimating a speed limit. In one embodiment, a speed limit may be estimated based on the presence of houses, a concrete median, lane markings, curbs, or rumble strips, a number of lanes, lane width, or other environmental attributes on or near a road. For example, the estimated speed limit may be used as a "sanity check" for a driver, or an automated driving system, to ensure that the vehicle is traveling approximately at the correct speed. In one embodiment, an estimate for a legal speed limit can be determined by using perception sensors. Perception sensors are those which sense the environment such as a camera, radar system, light detection and ranging (LIDAR) system, ultrasound system, or any other image or ranging detection system. For example, a system may map instantaneous perception-sensor information to a reasonable speed limit. In a case where the perception sensor is a camera, the estimator processes one or more images from the camera to determine a reasonable speed limit. For example, the object recognition or pattern recognition may be performed on perception data to detect or identify environmental attributes. In one embodiment, a neural network or graphical model may be used to map speed values to pixels. For example, areas of space may be labeled as 35 miles per hour (MPH), 40 MPH, 45 MPH, 55 MPH, etc. It will be appreciated that while United States primarily uses miles per hour, the disclosure is also applicable to metric speed units. Thus, the disclosure contemplates estimating and adjusting speed limits according to the location in which the vehicle may be used and operated without departing from the scope of the disclosure.

In one embodiment, estimation algorithms may be hard-coded or may be learned and modified using artificial intelligence. For example, the estimator may use a set of parameters which may be held constant or may be updated based on a driving history or experience of a vehicle. In one embodiment, an estimation system may implement an online learning algorithm. For example, the learning algorithm may use ab estimated output and a known speed limit to update parameters used to estimate speed limits. The known speed limit may be obtained from a driving history, map, speed, sign, or other source. In one embodiment, the learning algorithm updates the estimation parameters when there is high confidence in an arbitrated legal speed limit (e.g., based on a sign, map, or other source that provides a speed limit with a high level of accuracy). In one embodiment, a system or method may feed an image through a neural network or a machine learning algorithm to learn what aspects of the environment correspond to a known speed limit. For example, the embodiments may be capable of training a controller or system to travel at a given speed without comparing that speed information to a database or other known data source, such as in a case where a GPS signal or system is non-functional or incorrect.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed in greater detail below. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

Figure 1:
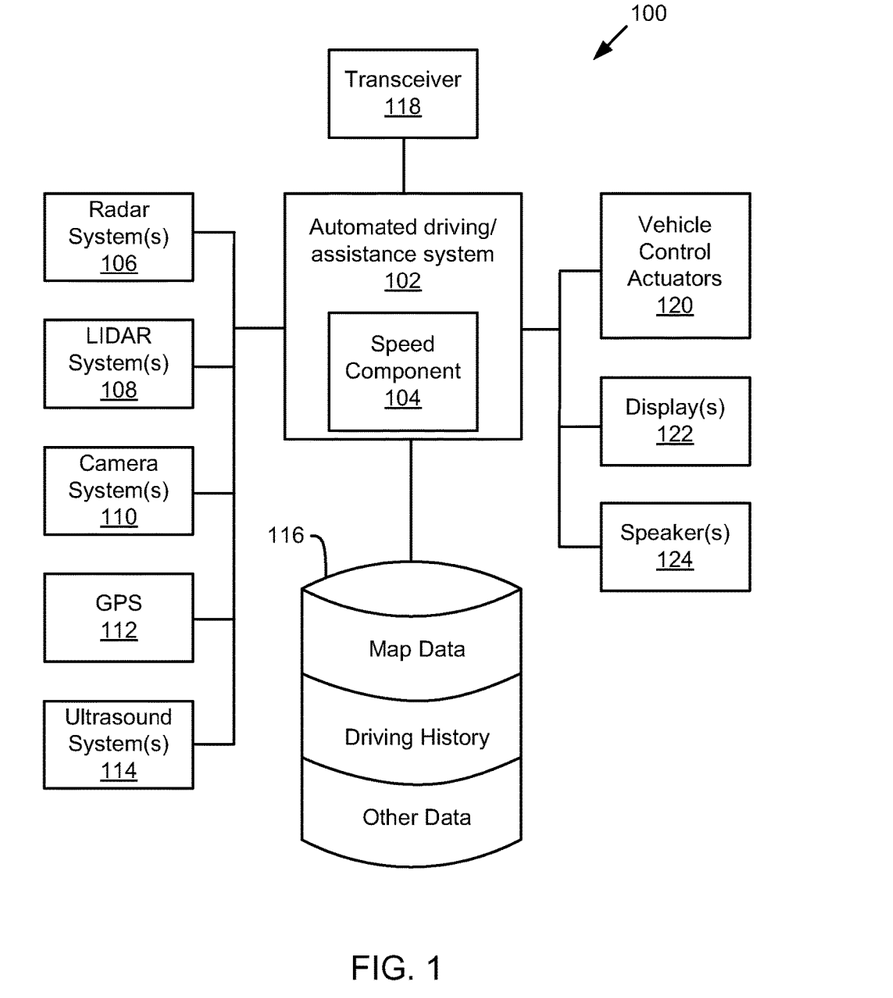
FIG. 1 is a schematic block diagram illustrating an implementation of a vehicle control system that includes an automated driving/assistance system.

Referring now to the figures, FIG. 1 illustrates a vehicle control system 100 that includes an automated driving/assistance system 102. The automated driving/assistance system 102 may be used to automate or control operation of a vehicle or to provide assistance to a human driver. For example, the automated driving/assistance system 102 may control one or more of braking, steering, acceleration, lights, alerts, driver notifications, radio, or any other auxiliary systems of the vehicle. In another example, the automated driving/assistance system 102 may not be able to provide any control of the driving (e.g., steering, acceleration, or braking), but may provide notifications and alerts to assist a human driver in driving safely. The automated driving/assistance system 102 includes a speed component 104, which may estimate a speed limit for a current location (e.g., based on sensor data at the current location) and may notify or alert a human driver or the automated driving/assistance system 102 of the estimated speed limit. For example, when no clear indication of a speed limit is present, the human driver or automated driving/assistance system 102 can use the estimated speed limit as a guide.

The vehicle control system 100 also includes one or more sensor systems/devices for detecting a presence of nearby objects or determining a location of a parent vehicle (e.g., a vehicle that includes the vehicle control system 100). For example, the vehicle control system 100 may include one or more radar systems 106, one or more LIDAR systems 108, one or more camera systems 110, a global positioning system (GPS) 112, and/or one or more ultrasound systems 114. The vehicle control system 100 may include a data store 116 for storing relevant or useful data for navigation and safety such as a driving history, map data, or other data. The vehicle control system 100 may also include a transceiver 118 for wireless communication with a mobile or wireless network, other vehicles, infrastructure, or any other communication system. The vehicle control system 100 may include vehicle control actuators 120 to control various aspects of the driving of the vehicle such as electric motors, switches or other actuators, to control braking, acceleration, steering or the like. The vehicle control system 100 may also include one or more displays 122, speakers 124, or other devices so that notifications to a human driver or passenger may be provided. The display 122 may include a heads-up display, dashboard display or indicator, a display screen, or any other visual indicator, which may be seen by a driver or passenger of a vehicle. The speakers 124 may include one or more speakers of a sound system of a vehicle or may include a speaker dedicated to driver notification.

It will be appreciated that the embodiment of FIG. 1 is given by way of example only. Other embodiments may include fewer or additional components without departing from the scope of the disclosure. Additionally, illustrated components may be combined or included within other components without limitation. For example, the speed component 104 may be separate from the automated driving/assistance system 102 and the data store 116 may be included as part of the automated driving/assistance system 102 and/or part of the speed component 104.

The radar system 106 may include any radar system well known in the art. Radar system 106 operation and performance is generally well understood. In general, a radar system 106 operates by transmitting radio signals and detecting reflections off objects. In ground applications, the radar may be used to detect physical objects, such as other vehicles, parking barriers or parking chocks, landscapes (such as trees, cliffs, rocks, hills, or the like), road edges, signs, buildings, or other objects. The radar system 106 may use the reflected radio waves to determine a size, shape, distance, surface texture, or other information about a physical object or material. For example, the radar system 106 may sweep an area to obtain data about objects within a specific range and viewing angle of the radar system 106. In one embodiment, the radar system 106 is configured to generate perception information from a region near the vehicle, such as one or more regions nearby or surrounding the vehicle. For example, the radar system 106 may obtain data about regions of the ground or vertical area immediately neighboring or near the vehicle. The radar system 106 may include one of many widely available commercially available radar systems. In one embodiment, the radar system 106 may provide perception data including a two dimensional or three-dimensional map or model to the automated driving/assistance system 102 for reference or processing.

The LIDAR system 108 may include any LIDAR system known in the art. Principles of operation and performance of LIDAR systems are generally well understood. In general, the LIDAR system 108 operates by emitting visible wavelength or infrared wavelength lasers and detecting reflections of the laser light off objects. In ground applications, the lasers may be used to detect physical objects, such as other vehicles, parking barriers or parking chocks, landscapes (such as trees, cliffs, rocks, hills, or the like), road edges, signs, buildings, or other objects. The LIDAR system 108 may use the reflected laser light to determine a size, shape, distance, surface texture, or other information about a physical object or material. For example, the LIDAR system 108 may sweep an area to obtain data or objects within a specific range and viewing angle of the LIDAR system 108. For example, the LIDAR system 108 may obtain data about regions of the ground or vertical area immediately neighboring or near the vehicle. The LIDAR system 108 may include one of many widely available commercially available LIDAR systems. In one embodiment, the LIDAR system 108 may provide perception data including a two dimensional or three-dimensional model or map of detected objects or surfaces.

The camera system 110 may include one or more cameras, such as visible wavelength cameras or infrared cameras. The camera system 110 may provide a video feed or periodic images, which can be processed for object detection, road identification and positioning, or other detection or positioning. In one embodiment, the camera system 110 may include two or more cameras, which may be used to provide ranging (e.g., detect a distance) for objects within view.

The GPS system 112 is one embodiment of a positioning system that may provide a geographical location of the vehicle based on satellite or radio tower signals. GPS systems 112 are well known and widely available in the art. Although GPS systems 112 can provide very accurate positioning information, GPS systems 112 generally provide little or no information about distances between the vehicle and other objects. Rather, they simply provide a location, which can then be compared with other data, such as maps, to determine distances to other objects, roads, or locations of interest.

The ultrasound system 114 may be used to detect objects or distances between a vehicle and objects using ultrasonic waves. For example, the ultrasound system 114 may emit ultrasonic waves from a location on or near a bumper or side panel location of a vehicle. The ultrasonic waves, which can travel short distances through air, may reflect off other objects and be detected by the ultrasound system 114. Based on an amount of time between emission and reception of reflected ultrasonic waves, the ultrasound system 114 may be able to detect accurate distances between a bumper or side panel and any other objects. Due to its shorter range, ultrasound systems 114 may be more useful to detect objects during parking or detect imminent collisions during driving.

In one embodiment, the radar system(s) 106, LIDAR system(s) 108, camera system(s) 110, and ultrasound system(s) 114 may detect environmental attributers near a vehicle. For example, the systems 106-110 and 114 may detect a number of lanes, lane width, shoulder width, road surface curvature, road direction curvature, rumble strips, lane markings, presence of intersections, road signs, bridges, overpasses, barriers, medians, curbs, or any other details about a road. As a further example, the systems 106-110 and 114 may detect environmental attributes that include information about structures, objects, or surfaces near the road, such as the presence of drive ways, parking lots, parking lot exits/entrances, sidewalks, walkways, trees, fences, buildings, parked vehicles (on or near the road), gates, signs, parking strips, or any other structures or objects.

The data store 116 stores map data, a driving history, and other data, which may include other navigational data, settings, or operating instructions for the automated driving/assistance system 102. The map data may include location data, such as GPS location data, for roads, parking lots, parking stalls, or other places where a vehicle may be driven or parked. For example, the location data for roads may include location data for specific lanes, such as lane direction, merging lanes, highway or freeway lanes, exit lanes, or any other lane or division of a road. The location data may also include locations for each parking stall in a parking lot or for parking stalls along a road. In one embodiment, the map data includes location data about one or more structures or objects on or near the roads or parking locations. For example, the map data may include data regarding GPS sign location, bridge location, building or other structure location, or the like. In one embodiment, the map data may include precise location data with accuracy within a few meters or within sub meter accuracy. The map data may also include location data for paths, dirt roads, or other roads or paths, which may be driven by a land vehicle.

The driving history (or drive history) may include location data for past trips or parking locations of the vehicle. For example, the driving history may include GPS location data for the previous trips or paths taken. As another example, the driving history may include distance or relative location data with respect to lane lines, signs, road border lines, or other objects or features on or near the roads. The distance or relative location data may be determined based on GPS data, radar data, LIDAR data, camera data, or other sensor data gathered during the previous or past trips taken by the vehicle. In one embodiment, the automated driving/assistance system 102 is configured to log driving data to the data store 116 for and during any trips or drives taken by the vehicle.

The transceiver 118 is configured to receive signals from one or more other data or signal sources. The transceiver 118 may include one or more radios configured to communicate according to a variety of communication standards and/or using a variety of different frequencies. For example, the transceiver 118 may receive signals from other vehicles. Receiving signals from another vehicle is referenced herein as vehicle-to-vehicle (V2V) communication. In one embodiment, the transceiver 118 may also be used to transmit information to other vehicles to potentially assist them in locating vehicles or objects. During V2V communication the transceiver 118 may receive information from other vehicles about their locations, other traffic, accidents, road conditions, the locations of parking barriers or parking chocks, or any other details that may assist the vehicle and/or automated driving/assistance system 102 in driving accurately or safely.

The transceiver 118 may receive signals from other signal sources that are at fixed locations. Infrastructure transceivers may be located at a specific geographic location and may transmit its specific geographic location with a time stamp. Thus, the automated driving/assistance system 102 may be able to determine a distance from the infrastructure transceivers based on the time stamp and then determine its location based on the location of the infrastructure transceivers. In one embodiment, receiving or sending location data from devices or towers at fixed locations is referenced herein as vehicle-to-infrastructure (V2X) communication. In one embodiment, the term V2X communication may also encompass V2V communication.

In one embodiment, the transceiver 118 may send and receive location data via a mobile network or cell connection. For example, the transceiver 118 may receive updated location data for a specific area as a vehicle travels along a roadway. Similarly, the transceiver 118 may receive historical driving data for a parent vehicle or other vehicles that have driven along a road or parked in a parking lot at that location or at that stall. For example, the transceiver 118 may receive data that indicates locations of signs, parking barriers or parking chocks, or other objects, which may be detectable using a radar system 106, LIDAR system 108, camera system 110, GPS system 112, or ultrasound system 114. If the transceiver 118 is able to receive signals from three or more infrastructure transceivers, the automated driving/assistance system 102 may be able to triangulate its geographic location.

In one embodiment, the transceiver 118 may send and receive data indicating a speed limit of a road, section of road, town, or geographical area. In one embodiment, the transceiver 118 may receive an arbitrated speed limit that is provided by an authoritative source, such as a specific reference, website, server, or sender. In one embodiment, the arbitrated speed limit may be a speed limit that has a high likelihood of being correct and is interpreted by the automated driving/assistance system 102 or speed component 104 as being a high-confidence legal speed limit.

In one embodiment, the automated driving/assistance system 102 is configured to control driving or navigation of a parent vehicle. For example, the automated driving/assistance system 102 may control the vehicle control actuators 120 to drive a path on a road, parking lot, driveway or other location. For example, the automated driving/assistance system 102 may determine a path and speed to drive based on information or perception data provided by any of the components 106-118.

In one embodiment, the speed component 104 is configured to determine an estimated speed limit based on data gathered or provided by the components 106-118. In one embodiment, the speed component 104 determine an estimated speed limit based on perception data captured by a radar system 106, LIDAR system 108, camera system 110, and/or an ultrasound system 114.

Figure 2:
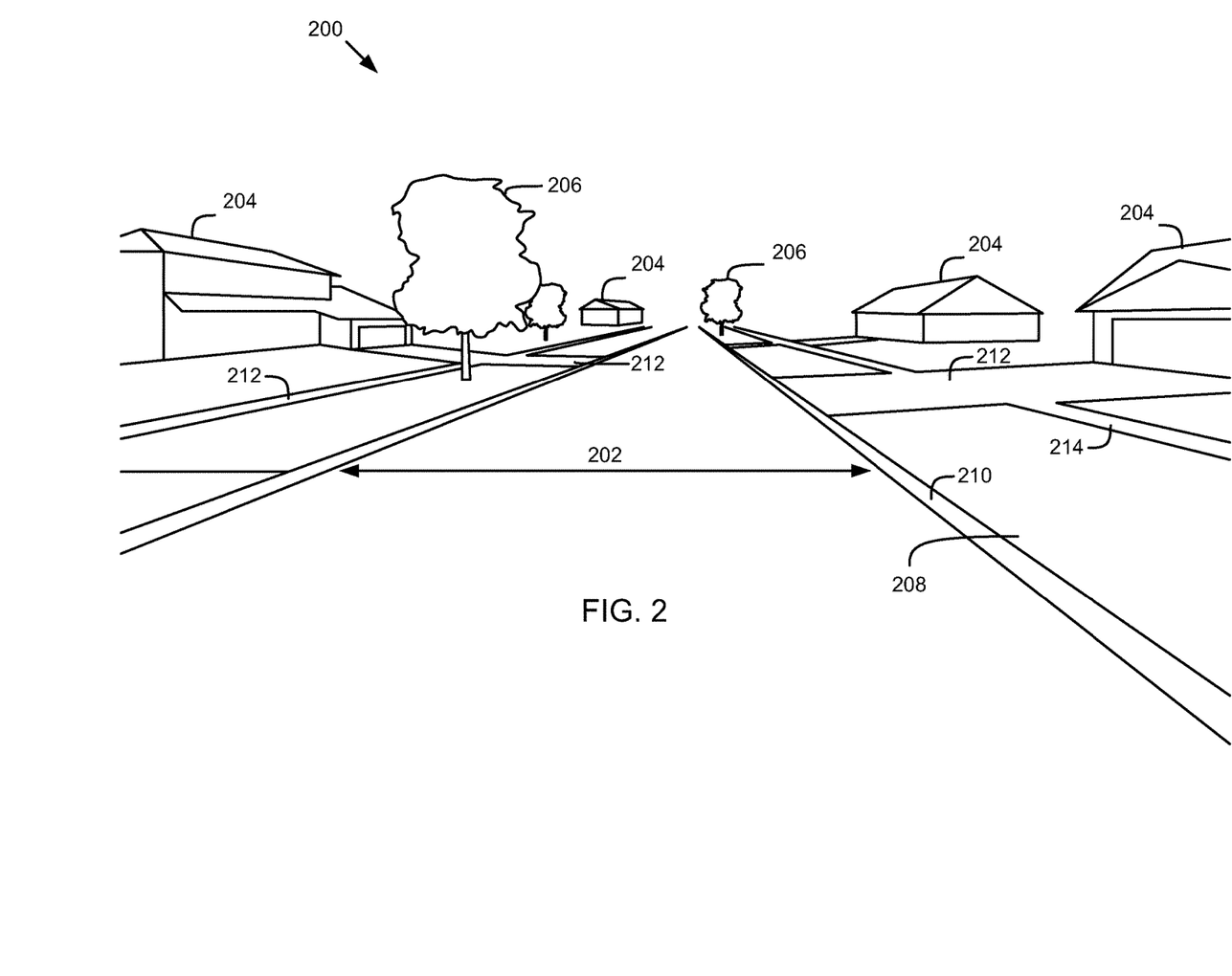
FIG. 2 illustrates a perspective view of an example road environment.
Figure 3:
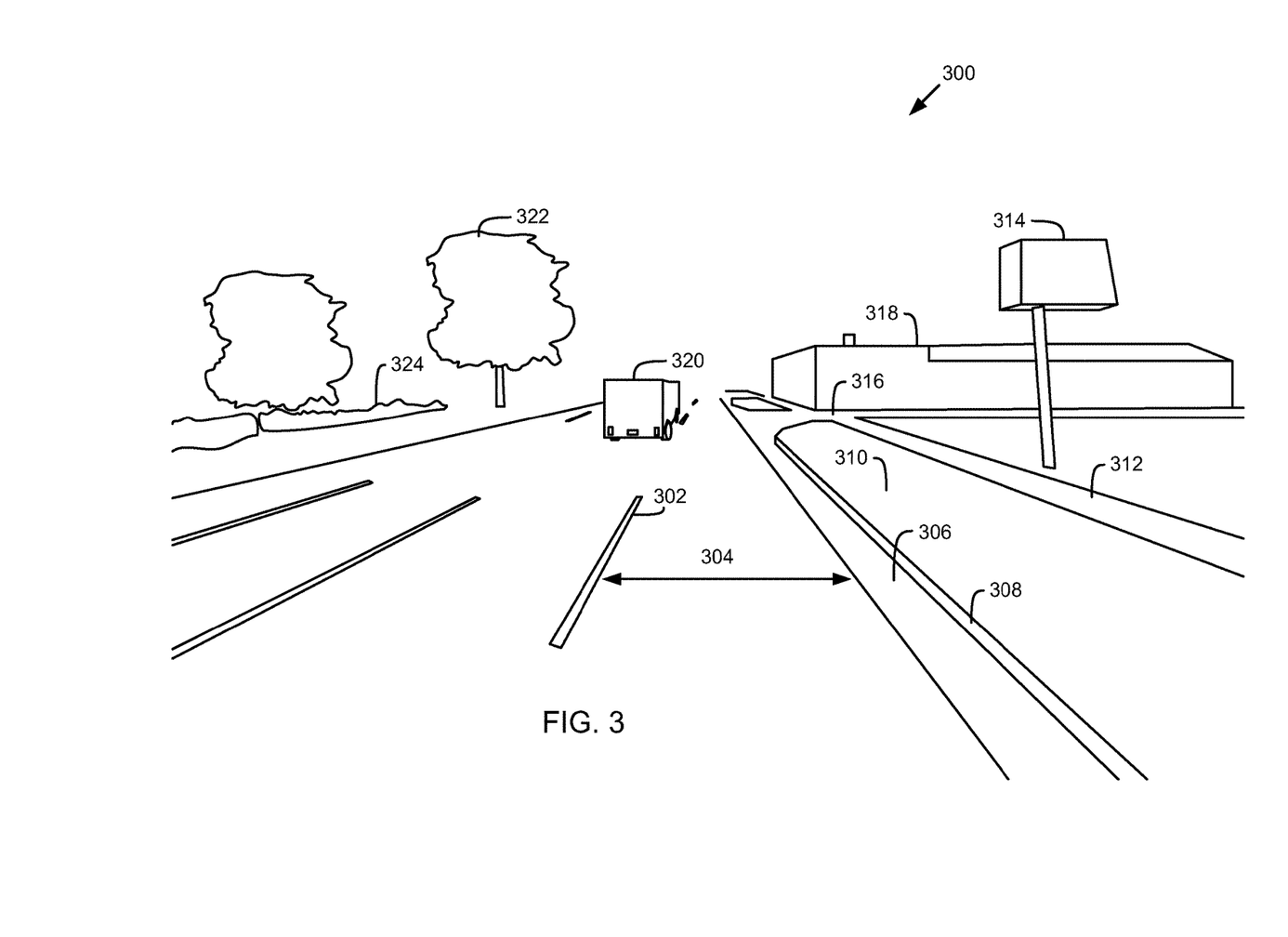
FIG. 3 illustrates a perspective view of another example road environment.
Figure 4:
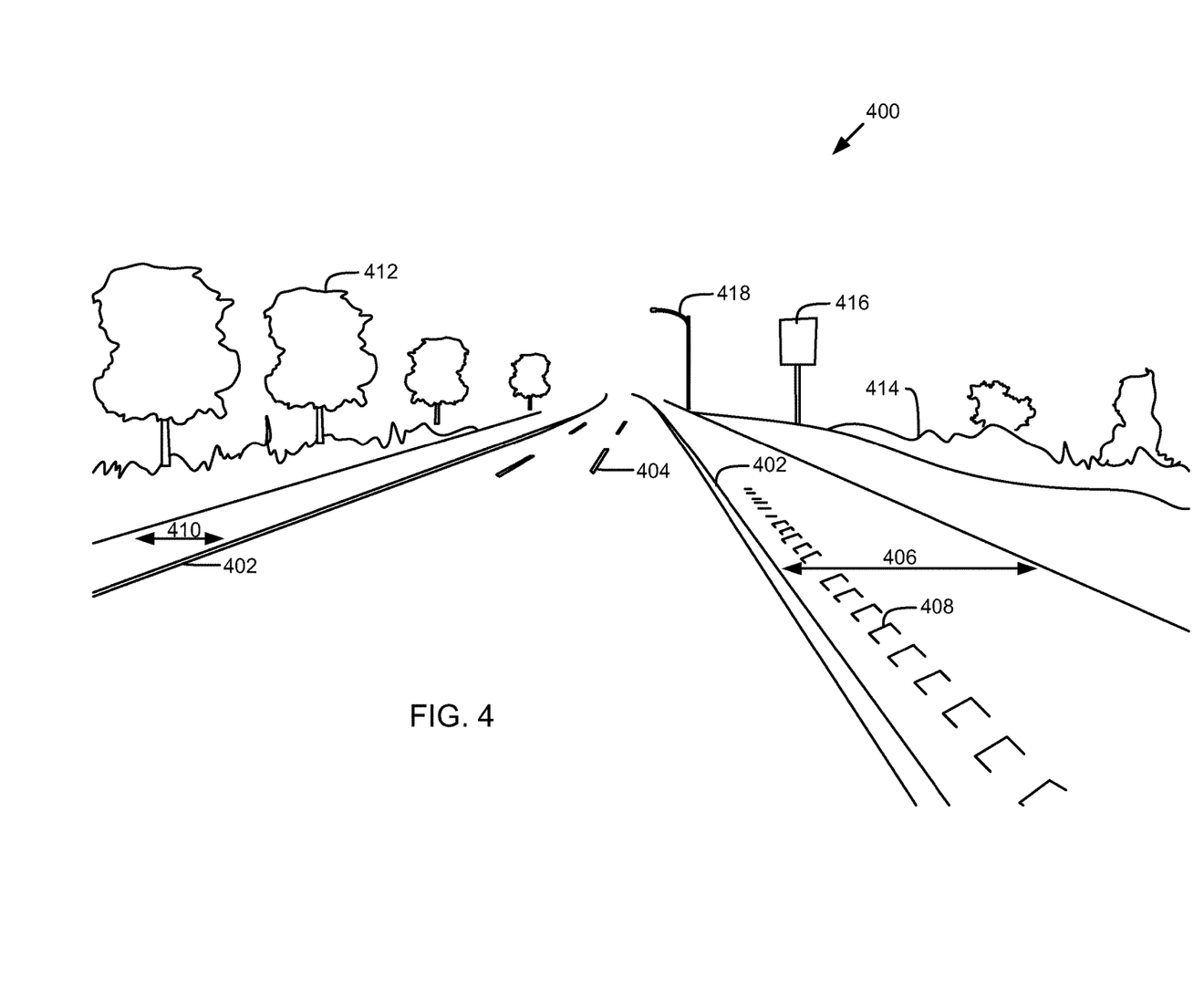
FIG. 4 illustrates a perspective view of yet another example road environment.

FIGS. 2-4 are line drawings illustrating perception data comprising images captured by a camera system 110. The speed component 104 may process the view(s) to identify attributes of environment depicted in the perception data (e.g., image, LIDAR data, radar data, ultrasound data, or other perception data). FIG. 2 is a perspective view of a residential street environment 200. In one embodiment, the speed component 104 may identify environmental attributes, which include values or objects such as a road width 202, one or more houses 204, one or more trees 206, one or more parking strips 208, one or more curbs 210, one or more driveways 212, sidewalks 214, or other attributes of the residential street environment 200. For example, the speed component 104 may use one or more image processing algorithms (such as edge finding, signature matching, or the like) to detect edges of objects or features and identify objects or features in the residential street environment 200. For example, the speed component 104 may determine a speed limit based on determining that a vehicle is currently in a residential environment. For example, the speed component 104 may determine that a speed limit is 25 MPH or 35 MPH, or less, in a residential environment depending upon the attributes of the particular street environment 200.

The road width 202 may include a distance between edges of pavement, curbs, painted lines, or the like. The road width 202 may generally, but not always, correspond positively with a higher speed limit. For example, more narrow roads may have lower speed limits, while wider roads may have higher speed limits. The houses 204 may include structures or surrounding environments that likely correspond to a residential house or home. For example, the presence of garage doors, walkways, sidewalks 214, periodic buildings, or structural detail and architecture usually corresponding to homes may be used to determine that an identified structure is a house 204. Trees 206 may be detected based on color, signature patterns of leaves, height, branches, movement, or the like. Parking strips 208 may be detected based on location near a road, placement between the road and a sidewalk 214, or the like. Curbs 210 may be detected based on color, height, location near a road, position between the road and other surface features, or the like. Driveways 212 may be identified based on the presence of one or more of a lack of parking strip 208, similar color and texture extending to the road, the presence of garage doors, parked vehicles, or the like. Sidewalks 214 may be detected based on color, surface smoothness or texture, position near a road, contrast between nearby terrain, presence of pedestrians, or the like.

The features or attributes 202-214 discussed are given by way of example only. For example, additional attributes, which may be detected in residential environments, may include cars parked on or near the street, the presence of pedestrians, children, animals, pets, residential landscaping features such as flowers and bushes, or any other aspect. In some situations, machine learning algorithms may identify additional features or attributes based on images or perception data. For example, distances from a road to structures, lack of signs, presence of house numbering, mailboxes, color schemes, or any other environmental attributes may be identified by a speed learning algorithm, which may have not been specifically coded for or recognized by a human.

FIG. 3 is a perspective view of a commercial or industrial street environment 300. In one embodiment, the speed component 104 may identify environmental attributes, which include values or objects such as lane or road markings 302, lane width 304, a number of lanes, color of lane markings to determine direction of traffic or the presence of bi-directional traffic, gutters 306, curbs 308, parking strips 310, sidewalks 312, large signs 314, intersections or intersecting roads 316, large or commercial buildings 318, vehicles 320, trees 322, bushes 324, or the like. For example, the speed component 104 may determine a speed limit based on determining that a vehicle is currently in a commercial, industrial or other street environment. For example, the speed component 104 may determine that a speed limit is 35 MPH or 45 MPH, or less, in a commercial or industrial environment based on the environmental attributes.

The road markings 302 may be identified based on contrasted color with a road surface, shape (e.g., long and skinny), presence on the road, or the like. The road markings 302 may be used to determine a lane width 304, a number of lanes, lane direction, and/or the presence of directional or bi-directional traffic. Gutters 306 may be detected based on color, slope, location near a road or curb 308, or the like. Signs 314 may be detected or identified based on size, lettering size and style, illumination, shape, or the like. Intersections or intersecting roads 316 may be detected based on position in relation to the road, width, or the like. Commercial, industrial, or public buildings, such as the building 318, may be detected based on size, architecture, style, building size, signage, proximity to a road or parking lot, or the like. In one embodiment, the presence of the objects or features 302-324, and their positional relationships with regard to a road may be used to determine that a road is in a commercial environment or that the road has a specific speed limit.

FIG. 4 is a perspective view of an interstate highway street environment 400. In one embodiment, the speed component 104 may identify environmental attributes, which include values or objects such as road boundary markings 402 (e.g., painted lines), lane markings 404, right shoulder width 406, rumble strips 408, left shoulder width 410, trees 412 and shrubbery 414, signs 416, street lights 418, or the like. For example, the speed component 104 may determine a speed limit based on determining that a vehicle is currently in an interstate highway environment. For example, the speed component 104 may determine that a speed limit is 55 or 65 MPH, or more, on an interstate highway. In one embodiment, a curvature of the road may also be detected to determine that a reduced or temporarily reduced speed limit is in effect.

The presence and color of the road boundary markings 402 and lane markings 404 may be used to determine a direction of travel for one or more lanes, the number of lanes, or the like. For example, if the left-most road boundary marking 402 depicted in the figure is yellow, then the speed component 104 may determine that all three lanes in the interstate highway street environment 400 are going in the same direction. As another example, if both of the road boundary markings 402 are white and one row of the lane markings 404 is yellow, the speed component 104 may determine that the vehicle is in a bi-directional traffic environment. The size of the shoulder 406 and the rumble strips 408 may indicate that a higher speed limit, such as 55 MPH, 65 MPH, or 75 MPH in the United States, is available. Furthermore, the presence and size of a left shoulder 410, the amount of trees 412 and shrubbery 414, and lack of buildings may also indicate that a higher speed limit is available. The size, shape, and wording on the sign 416, such as street signs, even if no speed limit is indicated, may also indicate that the road is an interstate road.

The environmental attributes discussed above are given by way of example only. For example, any additional environmental attributes may affect a speed limit. In one embodiment, the presence of school zone signs, flashing lights, or the like may indicate that a slower speed limit is required. In one embodiment, the presence of traffic cones, construction barriers, or the like may also indicate a reduced speed limit. In one embodiment, the speed component 104 may use environmental attributes as weighted factors indicating specific speed limits and/or zoned environments (e.g., residential, industrial, commercial, wilderness, highway, freeway, interstate, school zone, etc.). In one embodiment, a graphical model may be used to combine the presence, lack of presence, or the values of a current environment of a vehicle to determine a current estimated speed.

Although some examples herein are given with respect to camera images, other sensor data may also be used to acquire perception data and determine attributes of a current road or driving environment. For example, in one embodiment, a LIDAR system 108, radar system 106, and/or ultrasound system 114 may gather information about the environment and may be processed by the speed component 104 to estimate a current speed limit.

Figure 5:
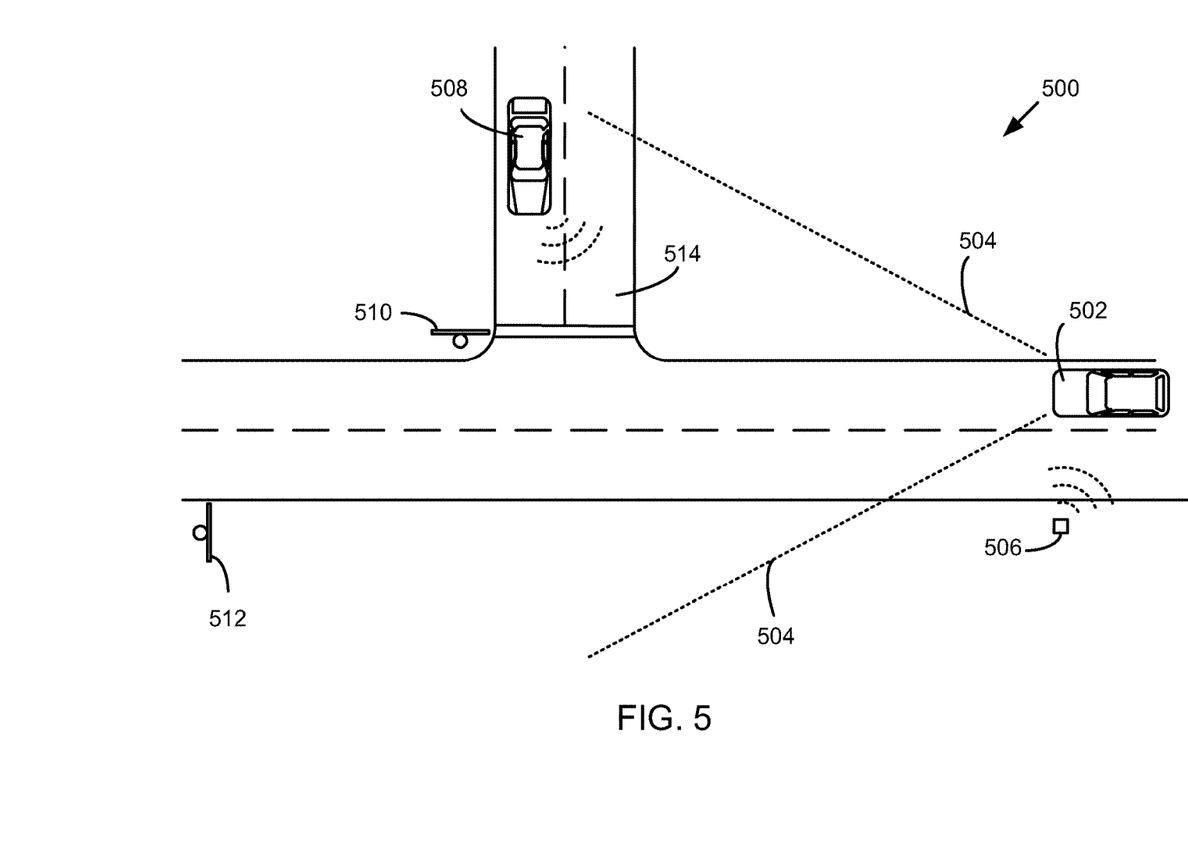
FIG. 5 is a schematic diagram illustrating a top view of an example road environment.

FIG. 5 is a schematic top view of a road 500 with a vehicle 502 traveling on the road. The vehicle 502 may include the system 100 of FIG. 1. In one embodiment, one or more sensors, such as a camera system 110 of the vehicle may have a viewing area 504 indicated by dotted lines. The viewing area 504 is illustrative only and may extend in any direction or all directions around the vehicle 502. The vehicle 502, or a speed component 104 of the vehicle 502, may receive perception data from objects, surfaces, or the like within the viewing area 504 and estimate a current speed limit. In one embodiment, the presence, or absence, of certain objects or environmental attributes may be determined by the vehicle 502 based on the data gathered regarding the viewing area 504.

In one embodiment, the vehicle 502 may process perception data to detect the presence of another vehicle 508, signs 510 or 512, an intersecting road 514, or any other environmental attributes discussed in relation to FIGS. 2-4 or elsewhere in the disclosure. Based on the detected objects or attributes, the vehicle 502 may be able to determine an estimated speed limit or an actual speed limit. For example, the sign 512 may be a speed limit sign that states an actual speed limit for the road 500. If a known speed limit can be detected or identified, the vehicle 502 may use perception data for machine learning or training of an estimation model to provide such known speed limit information to the vehicle 502. The term "known speed limit" may also be referred to herein as a high-confidence speed limit, arbitrated speed limit, or actual legal speed limit. In one embodiment, the sign 512 may not be a speed limit sign and may instead by a welcome sign, road identification sign, or any other sign. Although a known speed limit or arbitrated speed limit may not be derived from the sign, information on the sign may be used in combination with other environmental attributes to determine an estimated speed limit. For example, the sign may include a road identifier, which may indicate whether the road is an interstate road, city road, state road, wilderness road, private road, or any other type of road. The road identifier may be used in combination with the presence of an intersecting road 514 or other environmental attributes to estimate a current speed limit for the vehicle 502.

In addition to perception data, the vehicle 502 may obtain information from a stored map, stored driving history, or from wireless signals. For example, an infrastructure transmitter 506 is shown near the road, which may provide specific positioning, environmental attribute details, or other information to the vehicle. As further examples, the vehicle 502 may receive information from other vehicles, such as vehicle 508, or from a wireless communication network, such as a wireless communication network.

Figure 6:
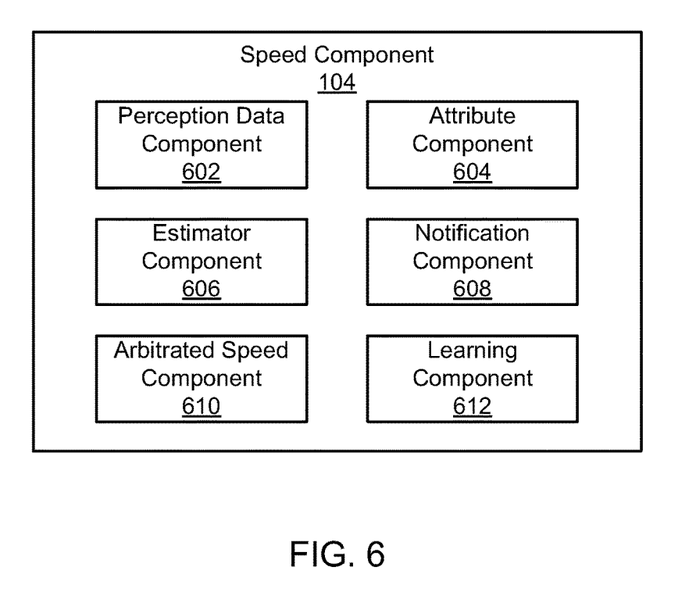
FIG. 6 is a schematic block diagram illustrating example components of a speed component, according to one implementation.

FIG. 6 is a schematic block diagram illustrating components of a speed component 104, according to one embodiment. The speed component 104 includes a perception data component 602, an attribute component 604, an estimator component 606, a notification component 608, an arbitrated speed component 610, and a learning component 612. The components 602-612 are given by way of illustration only and may not all be included in all embodiments. In fact, some embodiments may include only one or any combination of two or more of the components 602-612. Some of the components 602-612 may be located outside the speed component 104, such as within the automated driving/assistance system 102 or elsewhere.

The perception data component 602 is configured to receive perception data from one or more perception sensors that generate perception data about a region near a vehicle. The perception data may include data produced by one or more of a camera system 110, radar system 106, LIDAR system 108, and ultrasound system 114. In one embodiment, the one or more perception sensors include a camera and the perception data component 602 receives an image capture by the camera.

The attribute component 604 is configured to process perception data to detect one or more environmental attributes of an area near a vehicle based on the perception data. For example, the attribute component may perform object recognition, pattern recognition, object or surface edge detection, or other recognition to detect, calculate, identify, or otherwise determine the environmental attributes. In one embodiment, the attributes includes one or more physical attributes or features of a road, structure, or object in the region near the vehicle. For example, the attributes may include one or more of a size of a shoulder of a road, a number of lanes on a road, a presence of houses, a presence of buildings, a presence of parked cars, a presence of a concrete medium, a lane marking, a curb, a rumble strip, a lane width, and a road curvature. Similarly, the attributes may include the presence of interrupted and/or periodic buildings, driveways, walkways, cars parked in driveways, or the like. The attribute component 604 may detect any attribute discussed herein or additional attributes that may be discovered or identified by a machine learning algorithm.

In one embodiment, the perception data may include image or video captured by one or more cameras. The attribute component 604 may process the image or video to determine or identify the one or more environmental attributes. In one embodiment, for example, the attribute component 604 may determine attributes in the environment solely based upon one or more images. Similarly, the attribute component 604 may determine the attributes solely based upon sensor data from one or more of camera systems 110, LIDAR systems 108, radar systems 106, and ultrasound systems 114.

The estimator component 606 is configured to determine an estimated speed limit based on the environmental attributes. For example, the estimator component 606 may determine an estimated speed limit for an area near the vehicle based on environmental attributes determined by the attribute component 604. In one embodiment, the estimator component 606 is configured to determine the estimated speed limit based on an estimation model or a graphical model. The estimation model or graphical model may associate at least one of the one or more environmental attributes with a speed limit or an indication to adjust a speed limit. For example, certain attributes may correlate positively with an increased speed limit, while other attributes may correlate negatively with an increased speed limit. As another example, a first combination of certain attributes may indicate a specific speed limit, while combinations of other attributes, which may include attributes in common with the first combination, may indicate a different speed limit. Similarly, a graphical model may be traversed to arrive at an estimated speed limit.

In one embodiment, the estimator component 606 may determine a possible range of speed limits for the current environment. In one embodiment, the estimator component 606 may determine a speed limit at a lower end of a determined range to limit chances that the vehicle will exceed a legal speed limit. On the other hand, the estimator component 606 may determine a speed limit on an upper end to reduce drive time.

The notification component 608 is configured to provide an indication of the estimated speed limit to a human driver or automated driving system, such as 102, of the vehicle 502. For example, if a human driver is driving the vehicle 502, a visual or audio notification of the estimated speed limit may be provided within the cab of the vehicle 502. In one embodiment, the notification component 608 may provide an indication by sending a signal or message to the automated driving system 102 that indicates the estimated speed limit. In one embodiment, the notification component 608 provides an indication that the estimated speed limit is an estimate, and not the actual speed limit. Based on the estimated speed limit and/or the indication that it is an estimate, a human driver or automated driving system 102 may be able to determine a proper driving path, speed, or the like. For example, a human driver or automated driving system 102 may determine that the estimate is too low or too high and modify actual driving speed accordingly. In one embodiment, the notification component 608 may provide the estimated speed limit to a learning component 612 or arbitrated speed component 610.

The arbitrated speed component 610 is configured to attempt to determine a known or actual speed limit with high-confidence. For example, the arbitrated speed component 610 may determine a speed limit based on a trusted source or trusted indication of the speed limit, such as a speed limit sign (detected using a camera or other sensor), a map, an electronic horizon system that provides predictive driver assistance, data from other third party systems or networks, or the like. An electronic horizon system may provide map data for features such as night vision, curve speed warning, traffic sign detection, speed limits for the road, or the like.

In one embodiment, the arbitrated speed component 610 is configured to determine the arbitrated speed limit based on information provided by a third party. For example, the data provided by a third party may include a road sign detected by the one or more sensors, map data stored by the system, a vehicle-to-vehicle communication, an infrastructure-to-vehicle communication, and/or data received via a mobile network. In one embodiment, the arbitrated speed component 610 may determine the arbitrated speed limit based on a current location of the vehicle in response to determine a GPS location, map location, or other location. In one embodiment, the arbitrated speed component 610 may determine a high-confidence speed limit based on perception data gathered by one or more sensors. For example, the arbitrated speed component 610 may perform optical character recognition on an image of a sign captured by a camera system 110 to recognize that the sign is a speed limit sign and determine the posted speed.

In one embodiment, the arbitrated speed component 610 may track an amount of time or a distance or change in roads to determine whether a high-confidence speed limit is known for a current location of a vehicle. For example, the arbitrated speed component 610 may determine that an arbitrated speed limit has not been determined for at least a threshold time or distance. As another example, the arbitrated speed component 610 may determine that an arbitrated speed limit has not been determined for a current road or region of the current road.

In one embodiment, the arbitrated speed component 610 may be unable to determine a current speed limit for a period of time. During this period of time, a vehicle driving system or vehicle assistance system 102 may estimate a speed limit based on perception data and control driving based on the estimated speed limit or notify a driver of the estimated speed limit. At a later point, the arbitrated speed component 610 may determine an arbitrated speed limit and determine that the arbitrated speed limit corresponds to a location of the vehicle 502 during the period of time where no arbitrated speed limit was known. The arbitrated speed limit may be stored in a driving history for later access by the arbitrated speed component 610 in order to enable an arbitrated speed limit to be determined sooner on a subsequent trip. Similarly, the arbitrated speed limit may be used to train speed limit estimation by the speed component 104.

The learning component 612 is configured to perform machine learning to update a machine learning algorithm, model, function or database. In one embodiment, the learning component 612 is configured to update the estimation model to update or create an association between one or more environmental attributes and an estimated speed limit based on a high-confidence speed limit. For example, a database or model may store or represent a plurality of associations between environmental attributes and an estimated speed limit. Based on the presence of the environmental attributes, a specific speed limit may be indicated by the database, a graphical model, or any other data structure or algorithm. In one embodiment, the learning component 612 may detect a plurality of environmental attributes in perception data associated with an area having an arbitrated speed limit and associate the environmental attributes with the arbitrated speed limit. The environmental attributes and a speed limit may be associated with weighted averages, by groups, or by any other method. For example, a given set of environmental attributes may indicate a first speed limit with a first percentage or confidence level and also indicate a second speed limit with a second percentage or confidence level. The estimator component 606 may select the highest percentage or highest confidence level value, or may select the lower (or a middle or other value if there is more than two) of the two as the estimated speed limit.

In one embodiment, the learning component 612 may be trained using speed limits images, or other perception data even before a vehicle is used so that the speed component 104 has a base understanding of speed limit estimation. According to one embodiment, during further use of the vehicle, the learning component 612 may update a learning algorithm or model as the vehicle is driven through known and unknown speed limit areas based on gathered data, speed limits, data downloads, or any other method to improve performance or accuracy of speed limit estimation.

Figure 7:
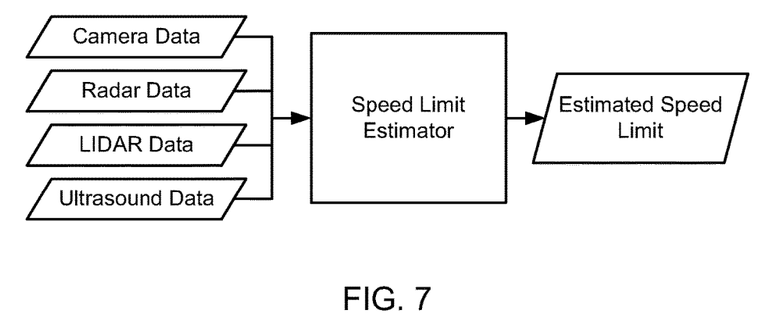
FIG. 7 is a schematic block diagram illustrating a model for speed limit estimation, according to one implementation.

FIG. 7 is a schematic block diagram illustrating a model for speed limit estimation, according to one embodiment. Perception data including one or more of camera data, radar data, LIDAR data, and ultrasound data may be provided to a speed limit estimator (such as a speed component 104 and/or estimator component). The speed limit estimator estimates a speed limit based at least in part or solely on the perception data and provides the estimated speed limit to an automated driving system, driving assistances system, or the like.

Figure 8:
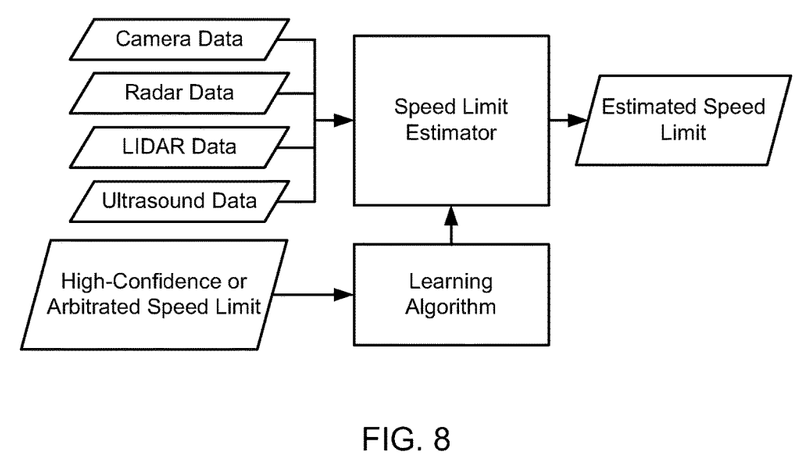
FIG. 8 is a schematic block diagram illustrating a model for speed limit estimation and machine learning, according to one implementation.

FIG. 8 is a schematic block diagram illustrating a model for speed limit estimation and machine learning, according to one embodiment. Perception data including one or more of camera data, radar data, LIDAR data, and ultrasound data may be provided to a speed limit estimator (such as a speed component 104 and/or estimator component). The speed limit estimator estimates a speed limit based at least in part or solely on the perception data and provides the estimated speed limit to an automated driving system, driving assistances system, or the like. If a high-confidence speed limit or arbitrated speed limit is available, a learning algorithm may update the speed limit estimator (such as a database, model, function, or map) based on the current perception data and the current arbitrated speed limit.

Figure 9:
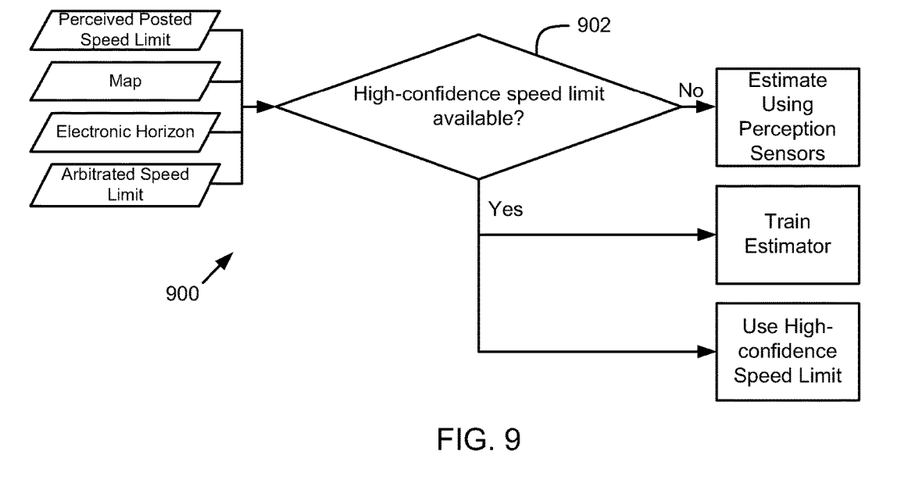
FIG. 9 is a schematic block diagram illustrating a method for determining whether to use an estimated speed limit or an arbitrated speed limit, according to one implementation.

FIG. 9 is a schematic flow diagram illustrating a method for determining whether to use an estimated speed limit or arbitrated speed limit (or known speed limit). The method 900 begins and the speed component 104 determines, at 902, whether a high-confidence speed limit is available. For example, the speed component 104 may determine whether a legal speed limit can be determined based on a perceived posted speed limit (speed limit sign), a map, an electronic horizon system, or other source of a high-confidence or arbitrated speed limit. If there is no high-confidence speed limit, the speed component 104 estimates a speed limit based on data from one or more perception sensors. If there is a high-confidence speed limit, the high-confidence speed limit may be used and an estimator (such as the estimator component 606) is trained based on the high-confidence speed limit and any available perception data for an area corresponding to the high-confidence speed limit.

Figure 10:
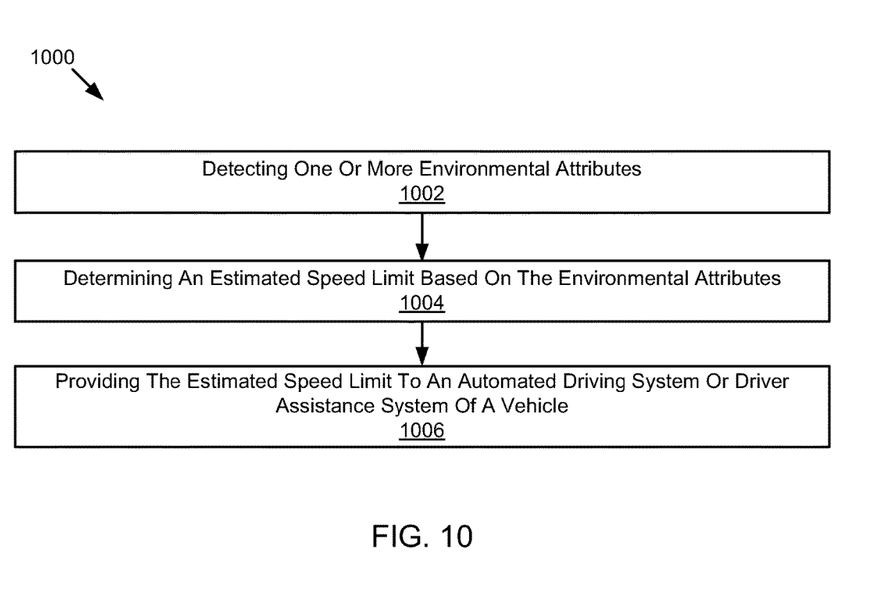
FIG. 10 is a schematic block diagram illustrating a method for determining a speed limit, according to one implementation.

Referring now to FIG. 10, a schematic flow chart diagram of a method 1000 for determining a speed limit is illustrated. The method 1000 may be performed by an automated driving/assistance system or a speed component, such as the automated driving/assistance system 102 of FIG. 1 or the speed component 104 of FIG. 1 or 6. For example, the method 1000 may correspond to estimating the speed limit using the perception sensors in FIG. 9.

The method 1000 begins as an attribute component 604 detects at 1002 one or more environmental attributes based on the perception data. An estimator component 606 determines at 1004 an estimated speed limit based on the environmental attributes. A notification component 608 provides at 1006 the estimated speed limit to an automated driving system or driver assistance system of the vehicle.

EXAMPLES

The following examples pertain to further embodiments.

Example 1 is a system that includes one or more perception sensors, an attribute component, an estimator component, and a notification component. The one or more perception sensors are configured to generate perception data about a region near a vehicle. The attribute component is configured to detect one or more environmental attributes based on the perception data. The estimator component is configured to determine an estimated speed limit based on the environmental attributes. The notification component is configured to provide the estimated speed limit to an automated driving system or driver assistance system of the vehicle.

In Example 2, the one or more environmental attributes in Example 1 include one or more physical attributes or features of a road, structure, or object in the region near the vehicle.

In Example 3, attribute component in any of Examples 1-2 detect one or more environmental attributes that include one or more of a size of a shoulder of a road, a number of lanes on a road, a presence of houses, a presence of buildings, a presence of parked cars, a presence of a concrete medium, a lane marking, a curb, a rumble strip, a lane width, and a road curvature.

In Example 4, the estimator component in any of Examples 1-3 is configured to determine the estimated speed limit based on an estimation model, wherein the estimation model associates at least one of the one or more environmental attributes with a speed limit or an indication to adjust a speed limit.

In Example 5, the one or more perception sensors in any of Examples 1-4 include a camera and wherein the attribute component is configured to process an image from the camera to determine the one or more environmental attributes.

In Example 6, any of Examples 1-5 further include an arbitrated speed component configured to determine a high-confidence speed limit.

In Example 7, the Example of 6 further includes a learning component configured to update an estimation model to update or create an association between the one or more environmental attributes and an estimated speed limit based on the high-confidence speed limit.

In Example 8, the arbitrated speed limit component in any of Examples 6-7 further determines the high-confidence speed limit based on data provided by a third party.

In Example 9, the data provided by a third party in any of Examples 6-8 includes a road sign detected by the one or more sensors, map data stored by the system, a vehicle-to-vehicle communication, an infrastructure-to-vehicle communication, and data received via a mobile network.

Example 10 is a method for machine learning of speed limits. The method includes receiving perception data from one or more perception sensors. The method includes receiving an indication of an arbitrated speed limit for a location corresponding to the perception data. The method includes identifying one or more environmental attributes based on the perception data, wherein the attributes comprise one or more physical attributes or features of a road, structure, or object near the road. The method includes associating the one or more environmental attributes with the arbitrated speed limit in an estimation model.

In Example 11, the one or more environmental attributes in Example 10 include one or more of a size of a shoulder of a road, a number of lanes on a road, a presence of houses, a presence of buildings, a presence of parked cars, a presence of a concrete medium, a lane marking, a curb, a rumble strip, a lane width, and a road curvature.

In Example 12, the location corresponding to the perception data in any of Examples 10-11 includes a first location, wherein the method further includes receiving perception data for a second location and determining an estimated speed limit for the second location based on the estimation model.

In Example 13, the one or more perception sensors in any of Examples 10-12 include a camera and the perception data comprises an image capture by the camera, wherein identifying the one or more environmental attributes comprises processing the image to determine the one or more environmental attributes.

In Example 14, the arbitrated speed limit in any of Examples 10-13 is received in data provided by a third party.

In Example 15, the data provided by a third party in Example 14 includes a road sign detected by the one or more sensors, map data stored by the system, a vehicle-to-vehicle communication, an infrastructure-to-vehicle communication, and data received via a mobile network.

Example 16 is a computer readable storage media storing instructions that, when executed by one or more processors, cause the processors to process perception data to detect one or more environmental attributes of an area near a vehicle based on the perception data. The instructions cause the processor to estimate a speed limit for the area near the vehicle based on the environmental attributes. The instructions cause the processor to notify an automated driving system or driver of the vehicle of the estimated speed limit.

In Example 17, the instructions in Example 16 further cause the processor to determine that one or more of an arbitrated speed limit has not been determined for at least a threshold time or distance and an arbitrated speed limit has not been determined for a current road or region of the current road.

In Example 18, the one or more environmental attributes in any of Examples 16-17 include one or more physical attributes or features of a road, structure, or object in the region near the vehicle.

In Example 19, the perception data in any of Examples 16-18 include an image from a camera and wherein processing the perception data includes processing an image from the camera to determine the one or more environmental attributes.

In Example 20, the instructions in any of Examples 16-19 further cause the processor to determine a high-confidence speed limit for the area and to update an estimation model to update an association between the one or more environmental attributes and an estimated speed limit based on the high-confidence speed limit.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

Embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A system comprising:
    one or more perception sensors configured to generate perception data about a region near a vehicle;
    an arbitrated speed component configured to determine that an arbitrated speed limit is not available;
    an attribute component configured to detect one or more environmental attributes based on the perception data;
    an estimator component configured to determine an estimated legal speed limit based on the environmental attributes in response to the arbitrated speed component determining that the arbitrated speed limit is not available; and
    a notification component configured to provide the estimated speed limit to an automated driving system or driver assistance system, whereby the automated driving system or the driver assistance system controls a driving speed of the vehicle based on the estimated speed limit.

2. The system of claim 1, wherein the one or more environmental attributes comprise one or more physical attributes or features of a road, structure, or object in the region near the vehicle.

3. The system of claim 1, wherein the one or more environmental attributes comprise one or more of:
    a size of a shoulder of a road, a number of lanes on a road, a presence of houses, a presence of buildings, a presence of parked cars, a presence of a concrete medium, a lane marking, a curb, a rumble strip, a lane width, and a road curvature.

4. The system of claim 1, wherein the estimator component is configured to determine the estimated legal speed limit based on an estimation model, wherein the estimation model associates at least one of the one or more environmental attributes with a legal speed limit or an indication to adjust a legal speed limit.

5. The system of claim 1, wherein the one or more perception sensors comprise a camera and wherein the attribute component is configured to process an image from the camera to determine the one or more environmental attributes.

6. The system of claim 1, wherein the arbitrated speed component is configured to determine the arbitrated speed limit if the arbitrated speed limit is available.

7. The system of claim 6, further comprising a learning component configured to update an estimation model to update an association between the one or more environmental attributes and an estimated legal speed limit based on the arbitrated speed limit.

8. The system of claim 6, wherein the arbitrated speed limit component determines the arbitrated speed limit based on data provided by a third party.

9. The system of claim 6, wherein the data provided by a third party comprises a road sign detected by the one or more sensors, map data stored by the system, a vehicle-to-vehicle communication, an infrastructure-to-vehicle communication, and data received via a mobile network.

10. A method for machine learning of legal speed limits, the method comprising:
    receiving perception data from one or more perception sensors of a vehicle;
    receiving an indication of an arbitrated speed limit for a location corresponding to the perception data;
    identifying one or more environmental attributes based on the perception data, wherein the attributes comprise one or more physical attributes or features of a road, structure, or object near the road;
    associating the one or more environmental attributes with a value of the arbitrated speed limit within an estimation model for determining an estimated legal speed limit; and
    providing the estimated legal speed limit to an automated driving system or driver assistance system, whereby the automated driving system or the driver assistance system controls a driving speed of the vehicle based on the estimated legal speed limit.

11. The method of claim 10, wherein the one or more environmental attributes comprise one or more of:
    a size of a shoulder of a road, a number of lanes on a road, a presence of houses, a presence of buildings, a presence of parked cars, a presence of a concrete medium, a lane marking, a curb, a rumble strip, a lane width, and a road curvature.

12. The method of claim 10, wherein the location corresponding to the perception data comprises a first location, wherein the method further comprises:
 receiving perception data for a second location;
 determining that an arbitrated speed limit for the second location is not available; and
 determining an estimated legal speed limit for the second location based on the estimation model.

13. The method of claim 10, wherein the one or more perception sensors comprise a camera and the perception data comprises an image capture by the camera, wherein identifying the one or more environmental attributes comprises processing the image to determine the one or more environmental attributes.

14. The method of claim 10, wherein the arbitrated speed limit is received in data provided by a third party.

15. The method of claim 14, wherein the data provided by a third party comprises a road sign detected by the one or more sensors, map data stored by the system, a vehicle-to-vehicle communication, an infrastructure-to-vehicle communication, and data received via a mobile network.

16. Non-transitory computer readable storage media storing instructions that, when executed by one or more processors, cause the one or more processors to:
 process perception data to detect one or more environmental attributes of an area near a vehicle based on the perception data;
 determine that an arbitrated speed limit is not available for the area near the vehicle;
 estimate a legal speed limit for the area near the vehicle based on the environmental attributes; and
 notify an automated driving system of the estimated legal speed limit, wherein the automated driving system controls a driving speed of the vehicle based on the estimated legal speed limit.

17. The computer readable storage media of claim 16, wherein the instructions further cause the one or more processors to determine that one or more of:
 the arbitrated speed limit has not been determined for at least a threshold time or distance; and
 the arbitrated speed limit has not been determined for a current road or region of the current road.

18. The computer readable storage media of claim 16, wherein the one or more environmental attributes comprise one or more physical attributes or features of a road, structure, or object in the region near the vehicle.

19. The computer readable storage media of claim 16, wherein the perception data comprises an image from a camera and wherein processing the perception data comprises processing an image from the camera to determine the one or more environmental attributes.

20. The computer readable storage media of claim 16, wherein the instructions further cause the one or more processors to determine the arbitrated speed limit for the area and to update an estimation model to update an association between the one or more environmental attributes and an estimated legal speed limit based on the arbitrated speed limit.

* * * * *